(12) United States Patent
Weiss et al.

(10) Patent No.: US 6,278,679 B1
(45) Date of Patent: Aug. 21, 2001

(54) SUPRA-DENSITY OPTICAL PHOTOCHROMIC REWRITE DATA ACCESS SYSTEM

(75) Inventors: Victor Weiss, Rehovot; Erez Hasman, Kiryat Ono; Moshe Oron, Rehovot, all of (IL)

(73) Assignee: Elop Eletro-Optics Industries Ltd., Rehovot (IL)

( * ) Notice: Subject to any disclaimer, the term of this patent is extended or adjusted under 35 U.S.C. 154(b) by 0 days.

(21) Appl. No.: 08/906,147

(22) Filed: Aug. 5, 1997

(30) Foreign Application Priority Data

Aug. 6, 1996 (IL) .......................................................... 119020

(51) Int. Cl.⁷ ....................................................... G11B 7/12
(52) U.S. Cl. ........................ 369/108; 369/44.37; 369/112; 369/118
(58) Field of Search .................................. 369/100, 44.14, 369/13, 108, 117, 118, 112, 43, 14, 44.37, 44.38, 109, 121, 116

(56) References Cited

U.S. PATENT DOCUMENTS

| | | | |
|---|---|---|---|
| 4,980,262 | * 12/1990 | Thomas et al. | 369/109 |
| 4,998,235 | * 3/1991 | Ishibashi et al. | 369/44.36 |
| 5,004,307 | * 4/1991 | Kino et al. | 369/13 |
| 5,125,750 | * 6/1992 | Corle et al. | 369/43 |
| 5,136,572 | 8/1992 | Bradley . | |
| 5,136,573 | 8/1992 | Kobayashi . | |
| 5,254,854 | * 10/1993 | Betzig | 250/234 |
| 5,288,998 | * 2/1994 | Betzig et al. | 250/227.26 |
| 5,293,032 | 3/1994 | Urshan . | |
| 5,325,342 | * 6/1994 | Vo Dinh | 369/13 |
| 5,430,861 | 7/1995 | Finn . | |
| 5,497,359 | * 3/1996 | Mamin et al. | 369/44.14 |
| 5,654,131 | * 8/1997 | Fujihira et al. | 369/288 |
| 5,696,372 | * 12/1997 | Grober et al. | 250/216 |
| 5,764,613 | * 6/1998 | Yamamoto et al. | 369/44.14 |
| 5,808,973 | * 9/1998 | Tanaka | 369/14 |
| 5,815,484 | * 9/1998 | Smith et al. | 369/275.1 |
| 5,828,644 | * 10/1998 | Gage et al. | 369/44.14 |
| 5,831,797 | * 11/1998 | Schaenzer et al. | 369/13 |
| 5,835,404 | * 11/1998 | Heller et al. | 369/100 |

* cited by examiner

Primary Examiner—Muhammad Edun
(74) Attorney, Agent, or Firm—Pollock, Vande Sande & Amernick

(57) ABSTRACT

The invention provides a near-field photochromic device for a supra-density optical memory, comprising a scanner carrying a data storage medium, an optical head having a tip, to be used for recording, readout and erasing, and located in close proximity to the data storage medium, and at least two lasers, alternatingly optically alignable with the optical head, wherein the data storage medium is a film consisting of a photochromic compound and wherein the distance between the tip and the data storage medium is within the limits of the near field of the optical head.

10 Claims, 2 Drawing Sheets

SUPRA-DENSITY OPTICAL PHOTOCHROMIC REWRITE DATA ACCESS SYSTEM

FIELD OF THE INVENTION

The present invention relates to optical storage devices for data storage. More particularly, the present invention relates to an apparatus for high-capacity information storage utilizing photochromic materials and near-field optical systems for writing, reading and erasing stored data.

BACKGROUND OF THE INVENTION

As the demand for data storage capacity continually grows, data storage technologies are being driven to higher areal densities. A major determinant of the size and price of high-performance computers is the memory. The data storage requirements of new high-performance computers are very great, typically, many gigabytes (from $10^9$ to $10^{12}$ bits). New and improved, compact, low-cost, highest-capacity memory devices are needed. These memory devices should be able to store many gigabytes of information, and should be capable of randomly retrieving such information at very fast random access speeds.

The rate of growth in areal density is being led by magnetic hard disk drives, where the current annual growth rate is approximately 60%. In optical memory, such as magneto-optical data storage, which in some aspects offers an attractive alternative to magnetic storage, the growth rate in density has been slower, as the areal density is limited by the focused laser spot size.

The spot size of conventional optical storage is limited by diffraction to approximately $\lambda/(2NA)$, where $\lambda$ is the free-space wavelength and NA is the numerical aperture of the objective lens. For $\lambda=0.78$ micron and NA=0.45, the spot size is approximately 0.8 micron and the typical densities in practical data storage devices are of the order of Gbits/inch$^2$.

To improve density, one possibility is to work at shorter wavelengths, typically at 488 nm, and to increase the numerical aperture to 0.64, which yields a spot size of about 0.4 micron and an area density of the order of 4 Gbits/inch$^2$.

In order to achieve high-density reversible optical storage devices, it has been suggested to make use of the 3rd dimension in photochromic and photorefractive materials. Destructive readout (the reduction/destruction of data during readout) and crosstalk (readout noise from non-addressed data) become serious limiting factors in terms of data stability and storage density for a given data retrieval error rate (bit-error-rate BER). For example, to achieve a BER of $10^{-9}$ in volume holographic memories, it was found that the theoretical storage density was reduced by 2 to 3 orders of magnitude.

In order to reduce destructive readout and crosstalk, writing and readout by two-photon absorption have been proposed. Only where the two photons intersect, is there any writing or readout of data. This approach has several disadvantages: First, two-photon absorption only occurs at very high power densities, which can only be achieved with ultra-short (picosecond) and high-power pulsed lasers; these are very expensive and of large dimensions and therefore not suitable for commercial memory devices. Second, destructive readout and cross-talk, though reduced, cannot completely be eliminated, and are very difficult to control in the 3D space of the material. Third, the requirements on the optical properties inside the 3D material space are very demanding, as additional degradation in storage density and cross-talk will occur, originating from optical aberrations and optical scattering. Fourth, the two-photon absorption involves long wavelength writing and readout, therefore, resolution will be reduced, as predicted by the diffraction-limited spot size and depth of field.

It is thus an object of the present invention to provide a supra high-density storage device having a capacity from 50 Gbits/inch$^2$ up to Tbits/inch$^2$, while avoiding the above drawbacks and disadvantages of the prior art.

SUMMARY OF THE INVENTION

According to the invention, the above object is achieved by providing a near-field photochromic device for a supra-density optical memory, comprising a scanner carrying a data storage medium; an optical head having a tip, to be used for recording, readout and erasing, and located in close proximity to said data storage medium; at least two lasers, alternatingly optically alignable with said optical head, wherein said data storage medium is a film consisting of a photochromic compound and wherein the distance between said tip and said data storage medium is within the limits of the near field of said optical head.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 5:
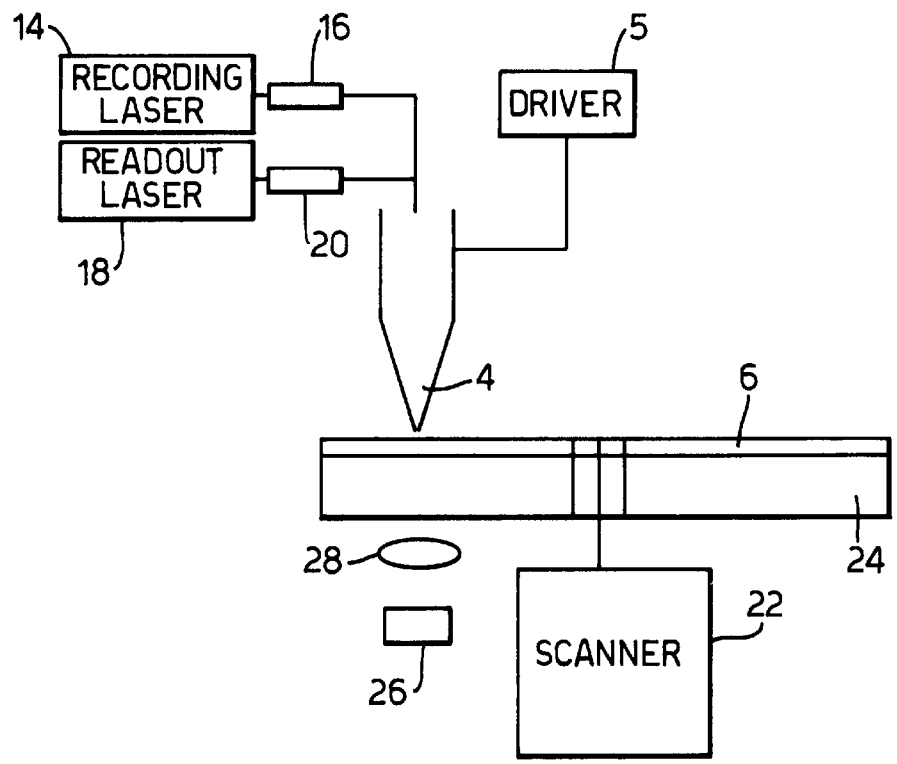

FIG. 5 schematically represents the device according to the invention.

DETAILED DESCRIPTION OF PREFERRED EMBODIMENTS

In order to attain the above-mentioned storage capacities, it is necessary to utilize a recording medium with molecular resolution (1–10 nm) and an optical arrangement that overcomes the diffraction-limited spot size of the far-field optical system approach.

Figure 1:
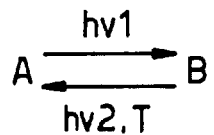
FIG. 1 shows a simplified photochromic reaction scheme.

The recording medium used is a photochromic material that is characterized by its ability to undergo a reversible chemical reaction between two or more different species, which is usually induced by the absorption of UV or visible radiation. The photo-induced chemical change is usually accompanied by a change in color (chromism) or refractive index. A simplified photochromic reaction scheme of two species A and B is shown in FIG. 1, where hv and T indicate the photonic and thermal absorptions, respectively. The newly formed chemical species may be switched back to its parent species by either thermal activation (heat) and/or the absorption of light, preferably at a different wavelength from that used for the forward reaction, as indicated in FIG. 1.

The photochromic species may either be thermally stable or metastable. For optical data storage, it is a precondition that all active species involved are to be thermally stable.

Upon irradiation of one of the species, usually the colored form, some of the known photochromic compounds exhibit luminescence, at a wavelength somewhat longer than that used for irradiation. As will be outlined below, luminescence will be exploited in the invention for readout. The ideal photochromic material for optical data storage would therefore have to be both thermally stable around room temperature and have good luminescence properties. Photochromic molecules that are claimed to possess such thermal and luminescent properties belong to the classes of spiropyrans, naphthacenequinones, and anthracene monomer-dimers, or the synthetic derivatives of these compounds.

The second problem to be addressed by the present invention is, as already mentioned, the reduction of the diffraction-limited spot size. This is achieved by combining the use of the photochromic compound and a so-called near-field optical head. In the near-field technique, the light is made to pass through an aperture 2 (subwavelength aperture) in a tip 4, that is much smaller than the wavelength $\lambda$ of the incident radiation (FIG. 2).

Figure 2:
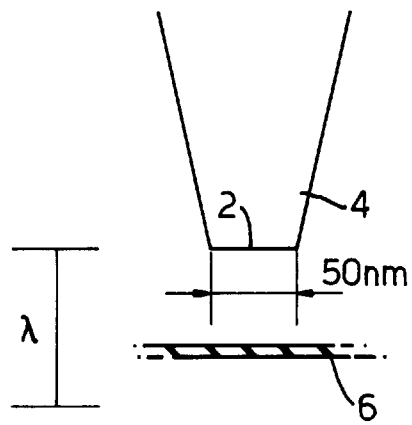
FIG. 2 illustrates the near-field principle.

Aperture 2 is scanned very close to the surface of the photochromic film 6 (less than a wavelength), hence "near-field" (FIG. 2). The light is collimated to the diameter of the aperture itself and does not have a chance to diverge.

The near-field optical head can be a micropipette with a small hole or an optical fiber tip having a small distal end with an aperture diameter of about 50 nm. The size of the physical beam could, in principle, be further reduced by reducing the diameter of the tip aperture 2, however, at the expense of the light intensity at the output. This may be overcome by applying an optically active tip 4. Such a tip will be filled or coated with photo- or electroluminescent material of inorganic or organic composition; light in the pipette or in the fiber will hit above luminescent material, which will then start to emit light. By such action, the physical dimensions of the near field can be maintained, but at significantly higher intensities.

The near-field concept provides a method for decreasing the writing spot size by 500 nm/50 nm=10 for open apertures, and by up to 500 nm/1nm=500 for coupling crystal apertures. This provides areal data storage density increases of 100–250,000.

Figure 3:
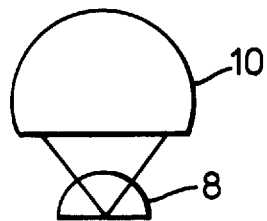
FIG. 3 shows the use of a solid immersion lens for application of the near-field principle.

A second approach to decrease the spot size can be accomplished by using a solid immersion lens 8 (SIL), made from high-index refraction material. Lens 8 is formed by placing a truncated sphere between a focusing objective 10 and the optical storage medium 6 (FIG. 3).

The wavelength inside lens 8 is reduced by the high index of the glass, leading to a reduction in the diffraction-limited spot size. It is necessary to place the storage medium 6 within the evanescent decay length, so that the small spot can be transmitted across the air gap. This is, therefore, a form of near-field optics (FIG. 3).

Figure 4:
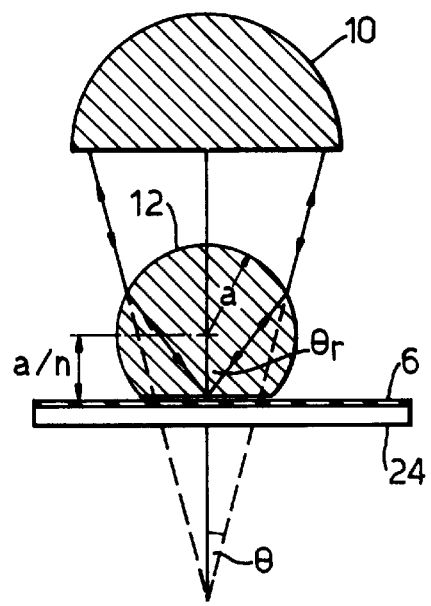
FIG. 4 represents the supersphere solid immersion lens.

A further improvement is to use a stigmatic focusing SIL 12, known as a supersphere. By using this approach, it is possible to increase the numerical aperture of the optical system by $n^2$, where n is the index of refraction of the lens material (FIG. 4). This technique should be capable of a 100 nm focused spot size, using blue light.

While the potential resolution of such SIL systems is not as great as the subwavelength aperture technique, the SIL has very high optical efficiency and thus may be more easily implemented into data storage technology.

The discrete molecular nature of the process in the photochromic compounds, coupled with the absence of granularity in solid polymer solutions, provides a resolution capability that in practice is limited only by the quality and spot size of the exposure system optics.

Thus, by combining the near-field method (subwavelength aperture or SIL) with photochromic optical storage media, it is possible to dramatically increase the areal density while retaining erasability and high data rate.

The device according to the present invention is schematically represented in FIG. 5. There is seen a recording (writing) laser 14 with its modulator 16, a readout laser 18 with its modulator 20, tip 4 and its driver 5, a scanner 22, e.g., of a CCD type with a substrate 24 carrying photochromic film 6, and a luminescence detector 26 with its optics 28.

In the following, the recording (writing), read-out and erasing modes of the device according to the invention are briefly discussed.

In principle, there are two writing modes:
a) Irradiation of A produces the written information B (forward reaction in FIG. 1), in the form of a colored data map.
b) A blanket irradiation of A first produces a homogeneous, colored medium of B; irradiation of B now produces the written information A (back reaction in FIG. 1), in the form of a bleached data map.

The two corresponding readout modes are as follows:
a) The written form may be read either by probing the intensity changes of the readout beam induced by the absorption changes due to B, or by collecting the luminescent light emitted from B in an excited state, induced during irradiation by the readout beam. It is preferable to collect the luminescent light, because it is of different wavelength, thereby increasing the signal-to-noise ratio (SNR).
b) The same readout modes as in (a) are applicable here. However, in this mode, it is preferable to probe the absorption changes, because here, the written data is of high transmittance, thereby increasing the SNR.

The two corresponding erasure modes are as follows:
a) The written form B will preferably be erased by photobleaching (backreaction in FIG. 1); the readout beam used for luminescence excitation, but turned up to high power, could be used, or alternatively, an erasure beam could be used, tuned to the wavelength of maximal quantum yield for photobleaching.
b) In this mode, erasure occurs by recoloration (forward reaction in FIG. 1); here, the advantage is that the quantum yield for coloration is usually substantially higher than that for bleaching, and therefore an erasure beam of low power will suffice.

Some photochromic media (for instance, a naphthacenequinone or an anthraquinone) can be illuminated with a blue wavelength for the writing process and with a green wavelength for the reading process, where the luminescent radiation differs from the write/read wavelengths, which will be detected as the "read" signal, enabling high signal to noise ratio detection.

The above-mentioned difficulties encountered by prior art devices and associated with 3D storage, two-photon processes, destructive readout and cross-talk have all been overcome by the Supra-Density Optical Memory (SDOM) devices according to the present invention, which uses 2D layer configurations, achieving the supra-density storage capacities by using the Near-Field Photochromic Optical Storage (NPOS) techniques as outlined above. Specifically, the advantages embodied in the present invention that concern write/readout/erasure are the following:

1) Writing (recording), readout and erasure processes are linear (one-photon) processes, and can therefore exploit low power and low cost laser diodes for all these processes.
2) Intrinsic destructive readout that inevitably occurs during photonic addressing can be minimized by tuning to a wavelength where the quantum yield for the photochromic transformations according to FIG. 1 is minimal.
3) Extrinsic destructive readout, due to 3D spatial overlap, is completely eliminated in the 2D-NPOS.
4) Data reduction due to intrinsic destructive readout, though minimized according to the above, is fully controllable; after a predetermined number of readout addressing, a rewrite address process will be applied. Furthermore, this rewrite address process has no influence on other data, due to the absence of 3D spatial overlap.
5) Cross-talk due to 3D spatial overlap is completely eliminated in the 2D-NPOS system, thereby insuring the maximal achievable storage density, limited only by the 2D-NPOS optics.
6) All the above-mentioned advantages concerning the readout process, also apply to the erasure process.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A photochromic supra-density optical memory, comprising:

a scanner carrying a data storage medium having molecular resolution;

an optical head having a tip, to be used for recording in the near field and for readout and erasing of information, located in close proximity to said data storage medium, and at least two lasers optically alignable with said optical head for irradiating said data storage medium with light projected from said lasers through said tip in different modes used respectively to read, write and erase information on said data storage medium, the distance between said tip and said data storage medium, when recording, being less than the wavelength of light produced by said lasers;

said data storage medium being a film that is thermally stable at around room temperature, has good luminescence properties, and consists of a photochromic compound capable of undergoing a reversible chemical reaction between different species induced by the absorption of radiation from said lasers, said different species having different colors or different refractive indices, or different light emission properties.

2. The device as claimed in claim 1, wherein said photochromic compound is selected from a group including spiropyrans, naphthacenequinones and anthracene monomer-dimers.

3. The device as claimed in claim 1, wherein said tip is a micropipette with an aperture smaller than the wavelength of the light produced by said lasers.

4. The device as claimed in claim 1, wherein said tip is filled with luminescent material which, upon being impinged by light from said lasers, will emit light.

5. The device as claimed in claim 1, wherein said tip is constituted by an optical fiber having a distal end of an aperture diameter smaller than the wavelength of the light produced by said lasers.

6. The device as claimed in claim 5, wherein the distal end of said fiber is coated with a luminescent material which, upon being impinged by light from within said fiber, will emit light.

7. The device as claimed in claim 1, wherein said optical head is provided with a solid immersion lens.

8. The device as claimed in claim 7, wherein said solid immersion lens is a supersphere.

9. The device as claimed in claim 1, further comprising a luminescence detector to be used for readout.

10. The device as claimed in claim 1, wherein said photochromic film is used in a substantially two-dimensional configuration.

* * * * *